(No Model.)

J. L. MATHER.
VEHICLE.

No. 313,507. Patented Mar. 10, 1885.

WITNESSES
J. W. Garner
E. G. Siggers

J. L. Mather
INVENTOR
by C. A. Snow & Co.
Attorney

N. PETERS. Photo-Lithographer. Washington. D. C.

UNITED STATES PATENT OFFICE.

JOHN L. MATHER, OF TOMAH, WISCONSIN.

VEHICLE.

SPECIFICATION forming part of Letters Patent No. 313,507, dated March 10, 1885.

Application filed December 19, 1884. (No model.)

*To all whom it may concern:*

Be it known that I, JOHN L. MATHER, a citizen of the United States, residing at Tomah, in the county of Monroe and State of Wisconsin, have invented a new and useful Improvement in Vehicles, of which the following is a specification, reference being had to the accompanying drawings.

My invention relates to vehicles designed more especially for use on mountainous paths and on muddy roads, a single horse to be used in drawing it; and it consists in the construction and novel arrangement of parts, as will be hereinafter fully described, and particularly pointed out in the claims.

Figure 1:
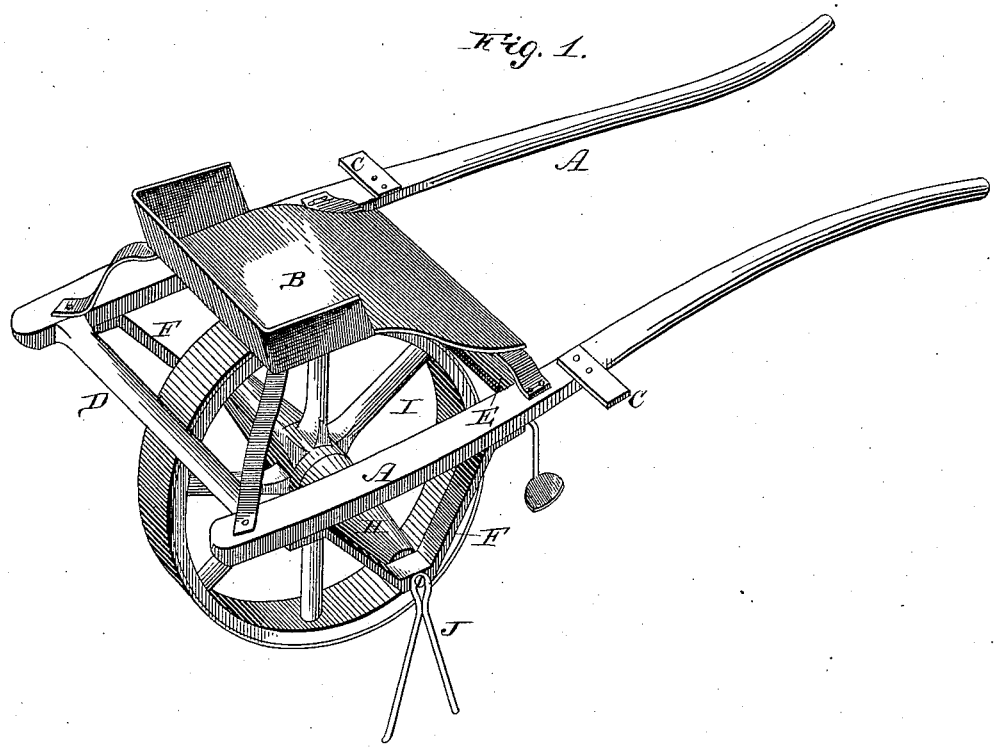
Figure 2:
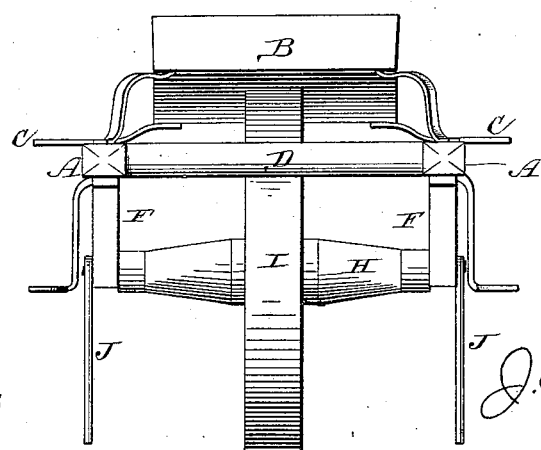

In the drawings, Figure 1 is a view in perspective of a vehicle embodying my improvements, and Fig. 2 is a rear elevation.

Referring by letter to the accompanying drawings, A designates the shafts, which are made in the style of sulky-shafts, and are provided with steps by which to mount to the seat B, which is supported on spring brace-rods to cause the vehicle to ride easy. The shafts A are also provided with foot-rests C, for the driver's feet when occupying the seat. The shafts are provided with cross-bars D and E, and to the under faces of the shafts hangers F, which form the bearings for the axle H, are secured by bolts. The axle H may be made to revolve in its bearings, or the wheel I may revolve on the axle, as may be desired. In this construction I make the tread of the wheel broader than the tread of an ordinary vehicle-wheel to prevent it from sinking too deeply in soft ground.

To the ends of the axle H, I connect swinging braces or supports J, which do not drag on the ground, but come sufficiently near to the ground to strike the ground when the shafts are swayed from side to side and prevent too great strain on the horse and harness. The arms of the swinging braces diverge from an eye at the upper end downwardly, so that each support has two feet or points to engage the ground when the vehicle is swayed or tilted from side to side by the movements of the horse.

I may employ two wheels instead of one, and place them so that they travel in the same line. The seat will then be located between the wheels. The seat may be placed in front of the wheel or in rear of the wheel. When over the wheel, the wheel must be made smaller than if the seat were placed in front or in rear of the wheel. Where two wheels are used, the horse is relieved of the weight; but I prefer to use the single wheel. The face or tread of the wheel should be from three to five inches wide, so that it will not sink much in muddy or soft roads.

Having thus fully described my invention, what I claim as new, and desire to secure by Letters Patent of the United States, is—

1. The combination, with the shafts provided with the seat and hangers, of the single wheel having its shaft journaled in the hangers, and the swinging supports secured to the ends of the axle, as set forth.

2. The combination, with the shafts provided with the spring-seat and hangers, of the shaft provided with the single wheel, and the diverging swinging supports connected to the ends of the axle, as set forth.

In testimony that I claim the foregoing as my own I have hereto affixed my signature in presence of two witnesses.

JOHN L. MATHER.

Witnesses:
R. A. RICHARDS,
HENRY ARIANS.